(12) United States Patent
Rahman et al.

(10) Patent No.: US 12,088,329 B2
(45) Date of Patent: Sep. 10, 2024

(54) WIRELESS CHIP TO CHIP COMMUNICATION WITH SELECTIVE FREQUENCY MULTIPLEXING WITH DIFFERENT MODULATION SCHEMES

(71) Applicant: Intel Corporation, Santa Clara, CA (US)

(72) Inventors: Mehnaz Rahman, San Jose, CA (US); Oner Orhan, San Jose, CA (US); Hosein Nikopour, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/131,866

(22) Filed: Dec. 23, 2020

(65) Prior Publication Data
US 2022/0200638 A1  Jun. 23, 2022

(51) Int. Cl.
*H04B 1/00* (2006.01)
*H04B 1/04* (2006.01)

(52) U.S. Cl.
CPC ......... *H04B 1/0057* (2013.01); *H04B 1/0067* (2013.01); *H04B 1/0483* (2013.01); *H04B 2001/0491* (2013.01)

(58) Field of Classification Search
CPC .. H04B 1/0057; H04B 1/0067; H04B 1/0483; H04B 2001/0491
USPC .......................................... 375/262
See application file for complete search history.

(56) References Cited

U.S. PATENT DOCUMENTS

| | | | | |
|---|---|---|---|---|
| 2013/0051212 | A1* | 2/2013 | Suzuki | H04L 27/366 |
| | | | | 375/296 |
| 2017/0237453 | A1* | 8/2017 | Egashira | H03F 1/32 |
| | | | | 375/297 |
| 2020/0212848 | A1* | 7/2020 | Lemberg | H03F 1/0294 |
| 2021/0119839 | A1* | 4/2021 | Buchwald | H04L 5/001 |

FOREIGN PATENT DOCUMENTS

CA   3100765 A1 * 11/2019 ............. H04B 17/30

OTHER PUBLICATIONS

Glavieux, A. et al., "Orthogonal frequency division multiplexing with BFSK modulation in frequency selective Rayleigh and Rician fading channels", IEEE, 1994, pp. 1919-1928, IEEE Transactions on Communications, vol. 42, Issue 234.

* cited by examiner

*Primary Examiner* — Tanmay K Shah
(74) *Attorney, Agent, or Firm* — VIERING, JENTSCHURA & PARTNER MBB

(57) ABSTRACT

A transmitter for chip to chip communication may include a modulator and a transmit frequency converter. The modulator may modulate a first received signal according to a first modulation scheme. The modulator may also modulate a second received signal according to a second modulation scheme. The transmit frequency converter may center the first received signal on a first frequency that does not comprise a phase within a radio frequency (RF) domain to generate a first centered signal. The transmit frequency converter may also center the second received signal on a second frequency that comprises a phase within the frequency band to generate a second centered signal. The second centered signal may be orthogonal to the first centered signal. A frequency gap may be positioned between the first centered signal and the second centered signal within the frequency band.

20 Claims, 5 Drawing Sheets

US 12,088,329 B2

WIRELESS CHIP TO CHIP COMMUNICATION WITH SELECTIVE FREQUENCY MULTIPLEXING WITH DIFFERENT MODULATION SCHEMES

TECHNICAL FIELD

The aspects discussed in the present disclosure are related to wireless chip to chip communication with selective frequency multiplexing with different modulation schemes.

BACKGROUND

Unless otherwise indicated in the present disclosure, the materials described in the present disclosure are not prior art to the claims in the present application and are not admitted to be prior art by inclusion in this section.

An electronic device (e.g., circuits, components, packages, chips, boards, racks, etc.) may operate using both a control plane and a data plane. The electronic device may include components that provide a control signal via the control plane and a data signal via the data plane. The components may perform various operations based on the control signal, the data signal, or some combination thereof. The components may provide the control signal to perform operations related to control of the electronic device (e.g., controlling components for processing the data signal). In addition, the components may provide the data signal to perform operations related to processing data generated by or for an end user (e.g., another circuit, another component, another package, another chip, another board, another rack, another electronic device, or a user of the electronic device).

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DETAILED DESCRIPTION

Figure 1:
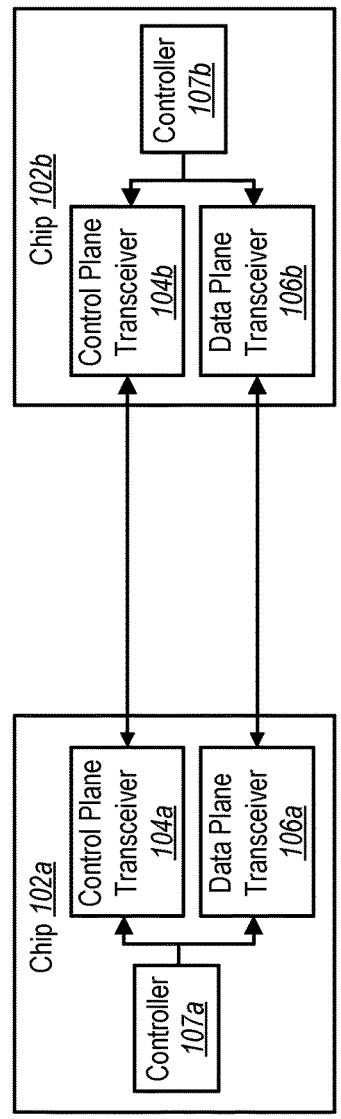
FIG. 1 illustrates a block diagram of an example environment to communicate wirelessly between chips.

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An electronic device (e.g., circuits, components, packages, chips, boards, racks, etc.) may operate using both a control plane and a data plane. The electronic device may include components that provide a control signal via the control plane and a data signal via the data plane. The components may perform various operations based on the control signal, the data signal, or some combination thereof. The components may provide the control signal to perform operations related to control of the electronic device (e.g., controlling components for processing the data signal). In addition, the components may provide the data signal to perform operations related to processing data generated by or for an end user (e.g., another circuit, another component, another package, another chip, another board, another rack, another electronic device, or a user of the electronic device).

In some aspects, the components may provide the control signal to perform quality of service (QoS) management operations. The components may provide the control signal to control a state of operation of the electronic device. For example, the components may provide the control signal to control a state of the components or the state of other components within the electronic device. For example, the components may provide the control signal to control a state of switches, variable gain amplifiers (VGAs), central processing units (CPUs), individual transistors, memory devices, or any other appropriate component within the electronic device.

In some aspects, the components may provide the control signal to control routing of the data signal. For example, the components may provide the control signal to generate a routing table, control or determine how the data signal is to be forwarded, indicate a modulation scheme, or any other appropriate routing function. Example protocols for the control signal may include address resolution protocol (ARP), routing information protocol (RIP), dynamic host configuration protocol (DHCP), or any other appropriate protocol.

In some aspects, the components may provide the data signal to perform data manipulation, signal manipulation, signal processing, or any other appropriate operation related to data (generally referred to in the present disclosure as signal processing). The components may perform the signal processing based on the control signal. The components may provide the data signal to permit data to be transmitted from a source (e.g., a component, an electronic device, or a physical position within the electronic device) to a destination (e.g., another component, another electronic device, or another physical position within the electronic device). The data signal may be routed (via switching) within the data plane by various components within the electronic device.

In some aspects, the components may provide the control signal at a control frequency that is different than a data frequency of the data signal. In some aspects, the data frequency may be greater than the control frequency.

The control plane and the data plane may include various components that permit the control signal and the data signal to propagate the planes. For example, the control plane and the data plane may include any number of traces, wires, vias, resistors, capacitors, inductors, transistors, or any other appropriate component to route the control signal and the data signal. As a number of components within the electronic device increases, so does a footprint of these components. In addition, as the number of components within the electronic device increases, so does a complexity of designing the electronic device to properly route the control signal and the data signal.

Some components within one or more electronic devices may be physically separated but form the same data plane or the same control plane. The components may be separated to address yield challenges in manufacturing processes, to reduce circuit footprints, to reduce circuit complexity. However, as capabilities of electronic devices continue to increase and as the separation of the components increases, a complexity and footprint associated with a wired interconnect between the separated components also increases.

A transceiver performing wireless communication for chip to chip or other types of communication may use sub-terahertz (THz) bands and implement ultra-wideband communication. However, some transceivers for ultra-wideband communication may be susceptible to inter carrier interference (ICI), increased power consumption, or some combination thereof. These transceivers may be cost or design prohibitive based on bit rate versus energy efficiency settings of an overall system.

These transceivers may include a transmit filter, a receive filter, or some combination thereof. The filters may separate signals within different frequency bands (e.g., may perform multiplexing). As a number of frequency bands increases so too does the number of filters in the transceivers. The transceivers may consume power to operate the filters. For wireless chip to chip communication, reduced power consumption, reduced latency, or some combination thereof of the transceiver may be integral to fit, form, or function of the overall system.

Some aspects described in the present disclosure may permit a transceiver to implement ultra-wideband communication while reducing power consumption and using selective frequency multiplexing to reduce ICI. In some aspects, the transceiver may generate orthogonal signals such that the frequency bands of the signals are orthogonal. Orthogonal signals may include signals that do not include overlapping frequency bands. For example, a first signal at a frequency band of 139-141 GHz and a second signal at a frequency band of 142-143 GHz may be orthogonal. In addition, the transceiver may modulate and demodulate the orthogonal signals using different modulation schemes.

In some aspects, the transceiver may divide a frequency band (e.g., a portion or all of a radio frequency (RF) domain) into multiple orthogonal sub-bands based on a number of signals to be transmitted or received. For example, the transmitter may divide the frequency band into four sub-bands if four signals are to be transmitted or received. The transceiver may determine the sub-bands to ensure a frequency gap is present between each sub-band. In addition, the transceiver may determine each of the sub-bands are to include a symbol rate that is substantially equal to the Nyquist bandwidth to maintain orthogonality of the signals in the frequency band. The frequency gap may reduce ICI that occurs.

The transceiver may operate such that the filters may be eliminated. Elimination of the filters may reduce power consumption of the transceiver compared to transceivers that include the filters. To ensure separation of the signals without the filters, the transceiver may modulate each signal according to a different modulation scheme. For example, the transceiver may modulate a first signal according to a first modulation scheme and a second signal according to a second modulation scheme.

In some aspects, the second modulation scheme may include a higher bit rate than the first modulation scheme. The transceiver modulating the signals using different modulation schemes may obtain a higher bit rate for THz communication compared to the modulating the signals using the same modulation scheme. In some aspects, the transceiver may include a simple receiver that includes frequency down conversion components and demodulation components.

The transceiver for chip to chip communication (generally referred to in the present disclosure as transceiver) may include a transmitter, a receiver, or some combination thereof. The transmitter may include a modulator and a transmit frequency converter. The receiver may include a receive frequency converter and a demodulator.

The modulator may modulate a first transmit (tx) signal according to a first modulation scheme. The modulator may also modulate a second tx signal according to a second modulation scheme. The transmit frequency converter may center the first tx signal on a first frequency to generate a first centered signal. The first frequency may not include a phase within the frequency band (e.g., the RF domain). For example, the transmit frequency converter may center the first centered signal at zero GHz. The transmit frequency converter may also center the second signal on a second frequency that includes a phase within the frequency band to generate a second centered signal. The second centered signal may be orthogonal to the first centered signal. In addition, the transmit frequency converter may generate the second centered signal such that a frequency gap is positioned between the first centered signal and the second centered signal.

The receive frequency converter may convert a first receive (rx) signal at the first frequency within the frequency band to a third frequency within the frequency band. The third frequency may be different than the first frequency. The first rx signal may be modulated according to the first modulation scheme and may include data. The receiver frequency converter may also convert a second rx signal at the second frequency within the frequency band to a fourth frequency within the frequency band. The fourth frequency may be different than the second frequency. The second rx signal may be modulated according to the second modulation scheme and may include data. The second rx signal may be orthogonal to the first rx signal. In addition, a frequency gap may be positioned between the first rx signal and the second rx signal.

The demodulator may demodulate the first rx signal according to the first modulation scheme. The demodulator may demodulate the first rx signal to recover the data within the first rx signal. The demodulator may also demodulate the second rx signal at the fourth frequency according to the second modulation scheme. The demodulator may demodulate the second rx signal to recover the data within the second rx signal.

At least one transceiver described in the present disclosure may include a low power frequency multiplexing transceiver for wireless chip to chip communication. In addition, the transceiver may not include the transmit filters, which may reduce power consumption of the transceiver. Further, the transceiver may reduce ICI with a higher bit rate due to the signals being orthogonal and modulated according to different modulation schemes. The transceiver may also permit multiple streams of data to be wirelessly transmitted to increase bit rate and throughput due to the different modulation schemes.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an example environment 100 to communicate wirelessly between chips 102, in accordance with at least one aspect described in the present disclosure. The environment 100 may include a first chip 102a and a second chip 102b (generally referred to in the present disclosure as "chip 102" or "chips 102"). The chips 102 may include circuits, packages, boards, or any other appropriate electronic device. For example, each of the chips 102 may include a GPU, a crypto, a central processing unit (CPU)/application processor (AP), a field programmable gate array (FPGA), a neural engine, a memory, circuits, components, packages, chips, boards, racks, or any other appropriate device.

The first chip 102a may include a first controller 107a communicatively coupled to a first control plane transceiver 104a and a first data plane transceiver 106a. The second chip 102b may include a second controller 107b communicatively coupled to a second control plane transceiver 104b and a second data plane transceiver 106b. The first control plane transceiver 104a and the second control plane transceiver 104b are generally referred to in the present disclosure as control plane transceiver 104 or control plane transceivers 104. The first data plane transceiver 106a and the second data plane transceiver 106b are generally referred to in the present disclosure as data plane transceiver 106 or data plane transceivers 106. The first controller 107a and the second controller 107b are generally referred to in the present disclosure as controller 107 or controllers 107.

The control plane transceivers 104 may communicatively couple to each other. In some aspects, a channel element (not illustrated in FIG. 1) may wirelessly couple the control plane transceivers 104 to each other. For example, the channel element may include multiple antennas with at least one antenna in the first chip 102a and at least one other antenna in the second chip 102b. In other aspects, the channel element may physically couple the control plane transceivers 104 to each other. The control plane transceivers 104 may transmit and receive control signals via the coupling to create a control plane that extends between the chips 102.

In addition, the data plane transceivers 106 may communicatively couple to each other. In some aspects, the channel element may wirelessly couple the data plane transceivers 106 to each other. In other aspects, the channel element may physically couple the data plane transceivers 106 to each other. The data plane transceivers 106 may transmit and receive data signals via the coupling to create a data plane that extends between the chips 102.

In some aspects, the control plane transceivers 104 and the data plane transceivers 106 may wirelessly couple to each other by transmitting and receiving signals within the frequency band (e.g., the RF domain). In these and other aspects, the frequency band may be separated into multiple channels that each include a frequency span. The wirelessly transmitted signals may be transmitted on one or more of the channels within the frequency band.

The controllers 107 may control a state or a mode of the corresponding control plane transceiver 104 and the corresponding data plane transceiver 106. In some aspects, the controllers 107 may include pre-defined settings for controlling the control plane transceivers 104 and the data plane transceivers 106.

In some aspects, the first control plane transceiver 104a may transmit the control signals to the second control plane transceiver 104b to control components within the second chip 102b. In other aspects, the second control plane transceiver 104b may transmit the control signals to the first control plane transceiver 104a to control components within the first chip 102a. In addition, the data plane transceivers 106 may transmit the data signals to transfer data between the chips 102.

Each of the control plane transceivers 104 and the data plane transceivers 106 may include one or more transmitters and one or more receivers. Each of the transmitters may include components for processing the corresponding signals in preparation for transmission. In addition, each of the receivers may include components for processing the corresponding signals that are received. The transmitters and receivers are discussed in more detail below.

Figure 2:
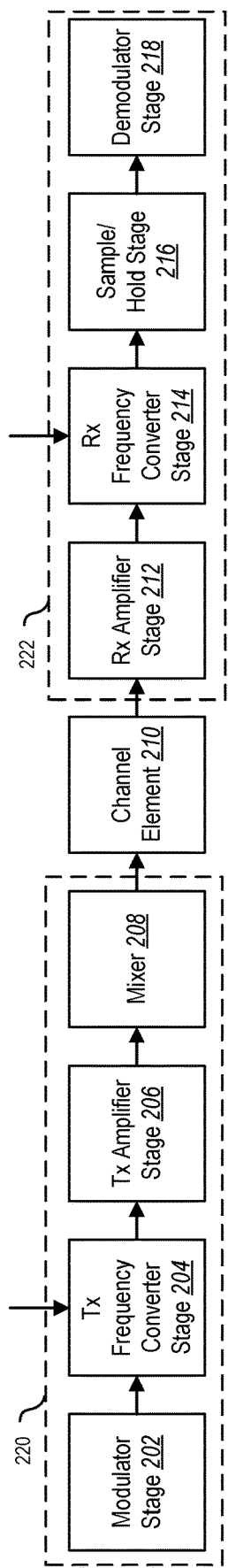
FIG. 2 illustrates a block diagram of an example transmitter, an example channel element, and an example receiver that may be implemented in the environment of FIG. 1.

FIG. 2 illustrates a block diagram of an example transmitter 220, an example channel element 210, and an example receiver 222 that may be implemented in the environment 100 of FIG. 1, in accordance with at least one aspect described in the present disclosure. The transmitter 220 may include a modulator stage 202, a Tx frequency converter stage 204, a Tx amplifier stage 206, and a mixer 208. The receiver 222 may include a Rx amplifier stage 212, a Rx frequency converter stage 214, a sample/hold stage 216, and a demodulator stage 218. The channel element 210 may include at least one of an antenna element, a stripline, and a waveguide.

The modulator stage 202 may modulate a first received signal according to a first modulation scheme. The modulator stage 202 may also modulate a second received signal according to a second modulation scheme. The first received signal and the second received signals may include data to be transmitted by the transmitter 220.

In some aspects, the transmitter 220 may determine a number of signals to be transmitted. The Tx frequency converter stage 204 may divide the frequency band by the number of signals to be transmitted by the transmitter 220. The Tx frequency converter stage 204 may center the first received signal on a first frequency within the frequency band to generate a first centered signal. The Tx frequency converter stage 204 may center the first received signal on a frequency that does not include a phase. The Tx frequency converter stage 204 may also center the second received signal on a second frequency within the frequency band to generate a second centered signal. The Tx frequency converter stage 204 may center the second received signal on a frequency that includes a phase.

The Tx frequency converter stage 204 may generate the second centered signal so as to be orthogonal to the first centered signal. In addition, the Tx frequency converter stage 204 may generate the second centered signal such that a frequency gap is positioned between the first centered signal and the second centered signal within the frequency band. In some aspects, the Tx frequency converter 204 may generate the first centered signal and the second centered signal at frequencies that are equal to different integer multiples of a quotient of the frequency band divided by the number of signals to be transmitted by the transmitter 220. In these and other aspects, the transmit frequency converter 204 may center the first received signal on the first frequency and the second received signal on the second frequency such that the frequency gap includes a bandwidth equal to a bandwidth of the frequency band minus a bandwidth of the first signal and minus a bandwidth of the second signal.

The Tx amplifier stage 206 may receive the first centered signal and the second centered signal. The Tx amplifier stage 206 may amplify the amplitudes of the first centered signal and the second centered signal. The mixer 208 may generate a transmit signal based on a sum of the first centered signal and the second centered signal. The mixer 208 may generate the transmit signal based on the sum of the first centered signal and the second centered signal including the amplified amplitudes. The channel element 210 may wirelessly transmit the transmit signal.

The channel element 210 may wirelessly receive the transmit signal as a receive signal. The Rx amplifier stage 212 may receive the receive signal. The receive signal may include a first portion and a second portion both including data. The first portion may be modulated according to the first modulation scheme. The second portion may be modulated according to the second modulation scheme. The Rx amplifier stage 212 may generate a first received signal at the first frequency based on the first portion. The first received signal may include data representative of the data in the first portion. The Rx amplifier stage 212 may generate a second received signal at the second frequency based on the second portion. The second received signal may include data representative of the data in the second portion.

The Rx frequency converter stage 214 may convert the first received signal at the first frequency to a third frequency within the frequency band. The third frequency may be different than the first frequency. The Rx frequency converter stage 214 may also convert the second received signal at the second frequency to a fourth frequency. The fourth frequency may be different than the second frequency. The second received signal may be orthogonal to the first received signal. In addition, a frequency gap may be positioned between the first received signal and the second received signal.

In some aspects, the sample/hold stage 216 may receive the first received signal at the third frequency and the second received signal at the fourth frequency. The sample/hold stage 216 may also filter the first received signal at the third frequency and the second received signal at the fourth frequency. In some aspects, the sample/hold stage 216 may be omitted.

The demodulator stage 218 may demodulate the first received signal according to the first modulation scheme. The demodulator stage 218 may demodulate the first received signal to recover the data within the first received signal. The demodulator stage 218 may also demodulate the second received signal according to the second modulation scheme. The demodulator stage 218 may demodulate the second received signal to recover the data within the second received signal.

Figure 3:
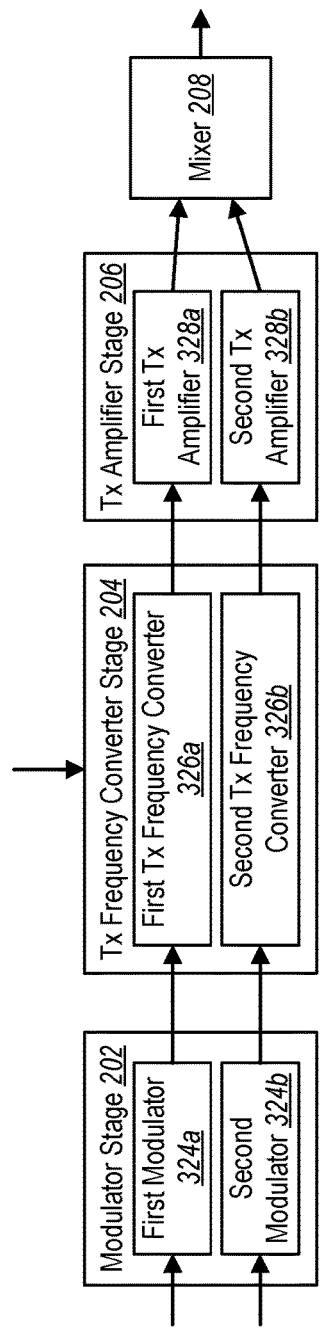
FIG. 3 illustrates a block diagram of an example transmitter.

FIG. 3 illustrates a block diagram of an example transmitter 220, in accordance with at least one aspect described in the present disclosure. The modulator stage 202 may include a first modulator 324a and a second modulator 324b. The Tx frequency converter stage 204 may include a first Tx frequency converter 326a and a second Tx frequency converter 326b. The Tx amplifier stage 206 may include a first Tx amplifier 328a and a second Tx amplifier 328b.

The first modulator 324a may modulate the first received signal according to the first modulation scheme. The second modulator 324b may modulate the second received signal according to the second modulation scheme. In some aspects, the second modulation scheme may include a higher bit resolution than the first modulation scheme. The first Tx frequency converter 326a may center the first received signal on the first frequency. The second Tx frequency converter 326b may center the second received signal on the second frequency. The first centered signal and the second centered signal may both include amplitudes. The second Tx frequency converter 326b may generate the second centered signal so as to be orthogonal to the first centered signal. The second Tx frequency converter 326b may also generate the second centered signal such that the frequency gap is positioned between the first centered signal and the second centered signal. The first centered signal and the second centered signal may both include amplitudes.

The first Tx amplifier 328a may receive the first centered signal. The first Tx amplifier 328a may also amplify the amplitude of the first centered signal. The second Tx amplifier 328b may receive the second centered signal. The second Tx amplifier 328b may also amplify the amplitude of the second centered signal. The mixer 208 may generate the transmit signal based on a sum of the first centered signal and the second centered signal.

Figure 4:
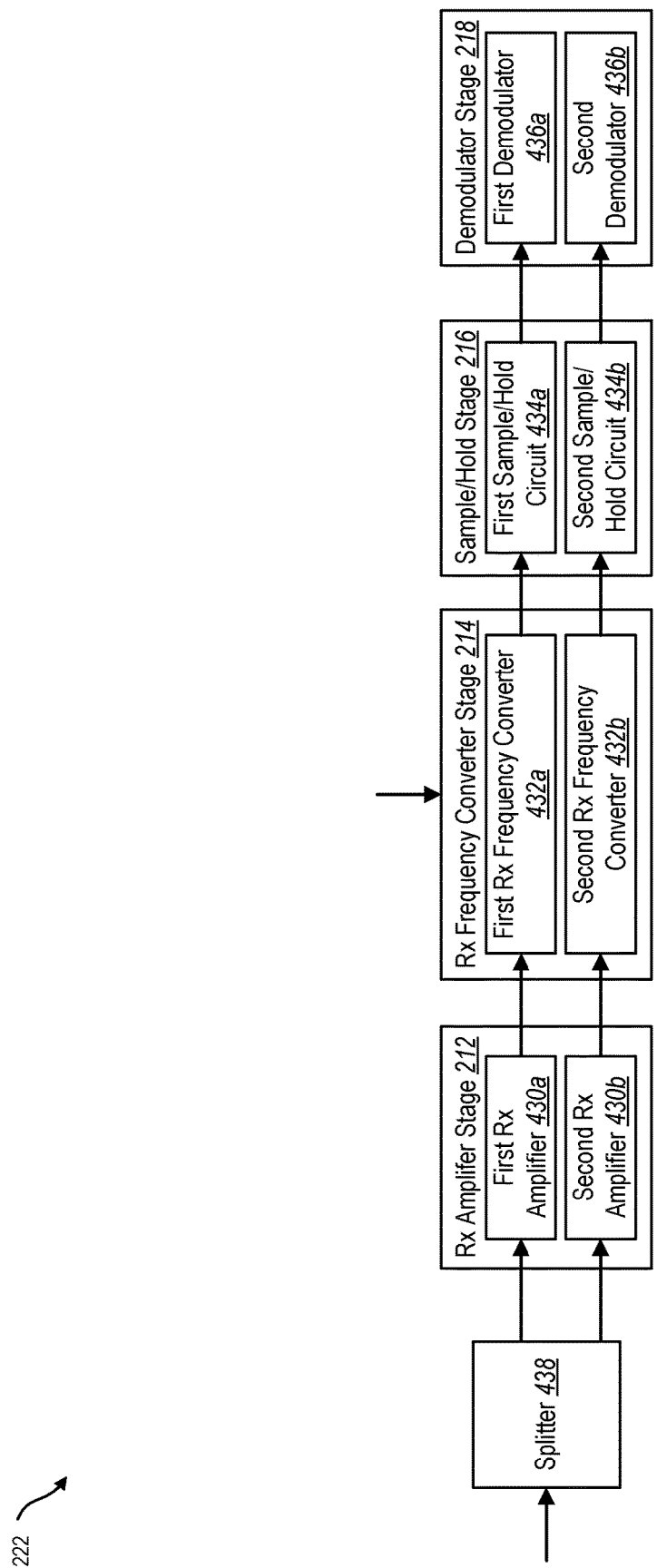
FIG. 4 illustrates a block diagram of an example receiver.

FIG. 4 illustrates a block diagram of an example receiver 222, in accordance with at least one aspect described in the present disclosure. The receiver 222 may include a splitter 438. The Rx amplifier stage 212 may include a first Rx amplifier 430a and a second Rx amplifier 430b. The Rx frequency converter stage 214 may include a first Rx frequency converter 432a and a second Rx frequency converter 432b. The sample/hold stage 216 may include a first sample/hold circuit 434a and a second sample/hold circuit 434b. The demodulator stage 218 may include a first demodulator 436a and a second demodulator 436b.

The splitter 438 may receive the receive signal that includes the first portion and the second portion. The splitter 438 may separate the first portion and the second portion. The first Rx amplifier 430a may generate the first received signal at the first frequency based on the first portion. The second Rx amplifier 430b may generate the second received signal at the second frequency based on the second portion.

The first Rx frequency converter 432a may convert the first received signal to the third frequency. The second Rx frequency converter 432b may convert the second received signal to the fourth frequency. The first sample/hold circuit 434a may receive the first received signal at the third frequency. The first sample/hold circuit may also filter the first received signal at the third frequency. The second sample/hold circuit 434b may receive the second received signal at the fourth frequency. The second sample/hold circuit 434b may also filter the second received signal at the fourth frequency.

The first demodulator 436a may demodulate the first received signal at the third frequency according to the first modulation scheme. The first demodulator 436a may demodulate the first received signal to recover the data within the first received signal. The second demodulator 436b may demodulate the second received signal at the fourth frequency according to the second modulation scheme. The second demodulator 436b may demodulate the second received signal to recover the data within the second received signal.

In some aspects, the sample/hold stage 216 may be omitted and the demodulator stage 218 may operate using the first received signal at the third frequency and the second received signal at the fourth frequency without the filtering.

Figure 5:
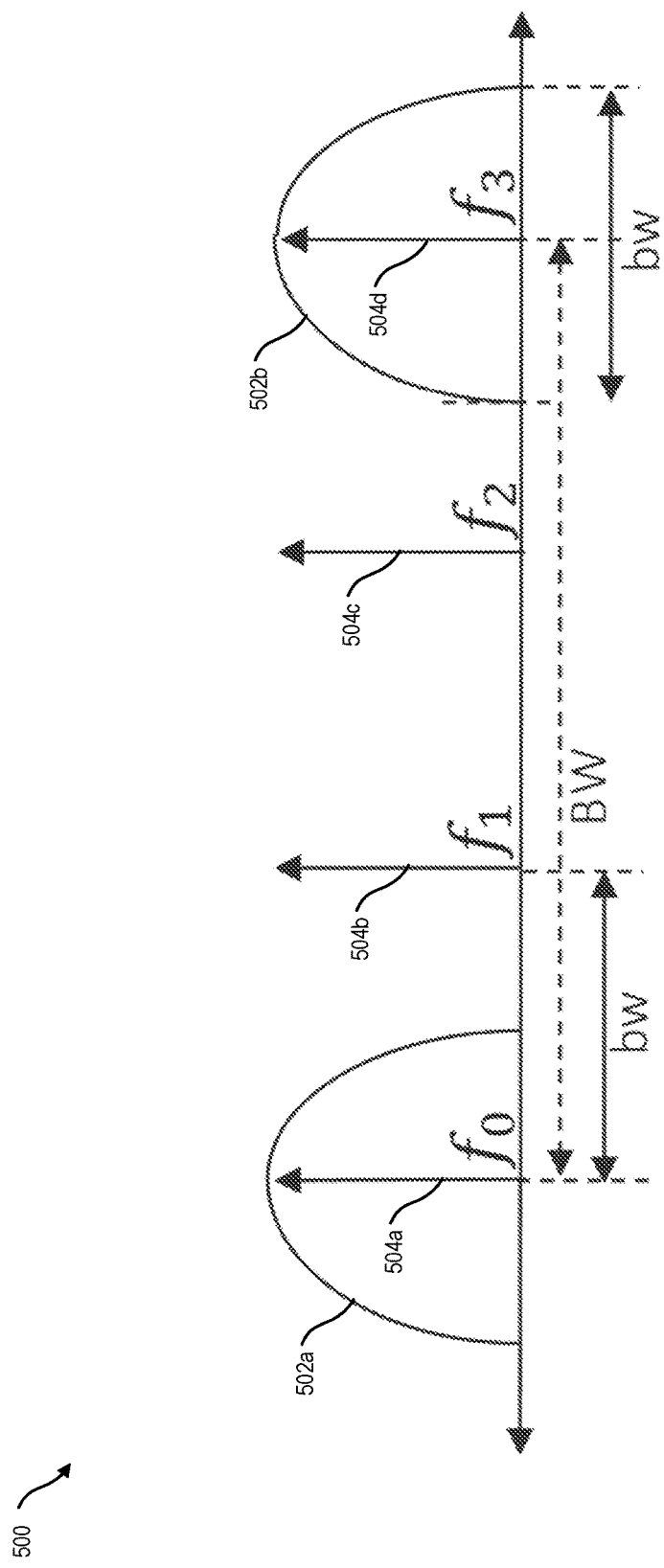
FIG. 5 illustrates a graphical representation of different carrier frequencies and signals, all according to at least one aspect described in the present disclosure.

FIG. 5 illustrates a graphical representation 500 of different carrier frequencies 504a-d and signals 502a-b, in accordance with at least one aspect described in the present disclosure. As illustrated in FIG. 5, a frequency band may be divided into four sub-bands. Each of the sub-bands may be centered around a different carrier frequency 504a-d. In addition, the two signals 502a-b are to be transmitted. The first signal 502a may be centered around the first carrier frequency 504a. The second signal 502b may be centered around the fourth carrier frequency 504d.

The signals 502a-b may be centered around the respective carrier frequencies 504a and d to provide as much of a gap (e.g., the frequency gap or a guard band) between the signals 502a-b as possible. As illustrated in FIG. 5, the frequency gap may be equal to 2*bw in which bw is equal to the bandwidth of the signals 502a-b. Including (e.g., increasing) the frequency gap may reduce ICI and power consumption by the transceiver.

If, for example, the frequency band is equal to one hundred forty GHz, a bandwidth of each sub-band (e.g., the bandwidth between neighboring carrier frequencies 504a-d) may be equal to 46.67 GHz. For example, the first carrier frequency 504a may be substantially equal to zero GHz, the second carrier frequency 504b may be substantially equal to 46.67 GHz, the third carrier frequency 504c may be substantially equal to 93.34 GHz, and the fourth carrier frequency 504d may be substantially equal to one hundred forty GHz.

The first signal 502a may be centered around zero GHz to ensure that the signal includes an amplitude but not a phase. The first signal 502a may be modulated according to a real signal data stream scheme (e.g., pulse amplitude modulation (PAM)). Modulating the first signal according to the real signal data stream scheme may reduce multipliers and hardware complexity within the transceiver for the first signal.

In some aspects, the transceiver may perform selective frequency multiplexing to maintain orthogonality between signals to be transmitted (e.g., orthogonality between sub-bands or carrier frequencies). The transceiver performing selective frequency multiplexing may eliminate filters (e.g., RF filters or baseband filters) in a transmitter, a receiver, or some combination thereof within the transceiver.

In some aspects, the transceiver may determine an available frequency band (e.g., a whole available bandwidth) and divide the available frequency band into a number of sub-bands. In these and other aspects, the available frequency band may be divided based on a total number of signals possibly to be simultaneously transmitted. In other aspects, the available frequency band may be divided based on a current number of signals to be simultaneously transmitted. In yet other aspects, the available frequency band may be divided into an arbitrary number of sub-bands. A bandwidth of each sub-band may be determined according to BW/(x−1) in which BW represents the available bandwidth and x represents the number of sub-bands.

The transceiver may generate each signal so as to be orthogonal to the other signals. In some aspects, a clock (e.g., a duty cycle) of the transmitter, the receiver, or some combination thereof may operate so as to cause the transceiver to generate each signal as orthogonal signals. In some aspects, the clock may be auto-synchronized. In other aspects, the clock may be cross synchronized. The clock may permit the transceiver to operate without a pulse shaping filter or other filters. The signals being orthogonal may act as guard bands to isolate the signals. Thus, the transceiver may only synchronize the sub-bands to ensure orthogonality. The transceiver may also modulate each signals according to a different modulation scheme to increase a bit rate and a throughput of the signals.

The transceiver may include a transmitter, a receiver, or some combination thereof. The transceiver (e.g., the transmitter, the receiver, or some combination thereof) may perform chip to chip communication. The transmitter may include a modulator, a transmit frequency converter, a mixer, a tx amplifier, and a channel element.

The modulator may modulate a first received signal according to a first modulation scheme. In some aspects, the first modulation scheme may include a four PAM scheme. The modulator may also modulate a second received signal according to a second modulation scheme. The second modulation scheme may include at least one of a quadrature phase shift keying (QPSK) modulation scheme, a binary phase shift keying (BPSK) modulation scheme, a quadrature amplitude modulation (QAM) scheme. In some aspects, the second modulation scheme may include a higher bit resolution than the first modulation scheme.

In some aspects, the transceiver (e.g., the transmit frequency converter) may determine a number of signals to be transmitted by the transmitter. The transceiver may divide the frequency domain by the number of signals to be transmitted by the transmitter. The transmit frequency converter may center the first received signal on a first frequency within the frequency band to generate a first centered signal. The first frequency may not include a phase within the frequency band. The transmit frequency converter may also center the second received signal on a second frequency within the frequency band. The second frequency may include a phase within the frequency band to generate a second centered signal. The second centered signal may be orthogonal to the first centered signal. In addition, a frequency gap may be positioned between the first centered signal and the second centered signal within the frequency band.

In some aspects, the first frequency and the second frequency may be positioned at frequencies that are equal to different integer multiples of a quotient of the frequency band divided by the number of signals to be transmitted by the transmitter. In these and other aspects, the frequency gap may be called a guard band. In some aspects, the first frequency may be substantially equal to zero gigahertz (GHz).

The first frequency may include a first frequency band and the second frequency may include a second frequency band. The first received signal may include a first symbol rate that is equal to a Nyquist bandwidth of the first frequency band. In addition, the second received signal may include a symbol rate that is equal to the Nyquist bandwidth of the second frequency band. Further, the first received signal may include a first bandwidth and the second received signal may include a second bandwidth. In some aspects, the transmit frequency converter may center the first received signal on the first frequency and the second received signal on the second frequency such that the frequency gap is sized based on the first bandwidth, the second bandwidth, and the frequency band.

In some aspects, the first bandwidth and the second bandwidth may be equal to each other. In these and other aspects, the transmit frequency converter may center the first received signal on the first frequency and the second received signal on the second frequency such that the frequency gap includes a bandwidth equal to a bandwidth of the frequency band minus a bandwidth of the first signal and minus a bandwidth of the second signal.

In some aspects, the first bandwidth and the second bandwidth may be determined according to:

$$\frac{BW}{x-1}$$

in which x is equal to a number of carriers (e.g., sub-bands or carrier frequencies) within the frequency band and BW is equal to an available bandwidth of the frequency band.

The tx amplifier may receive the first centered signal and the second centered signal. In some aspects, the first centered signal and the second centered signal may both include amplitudes. The tx amplifier may amplify the amplitudes of the first centered signal and the second centered signal. In some aspects, the transmitter may include a channel element that is driven by the tx amplifier.

The mixer may generate a transmit signal based on a sum of the first centered signal and the second centered signal. The mixer may generate the transmit signal based on a sum of the first centered signal and the second centered signal. In some aspects, the mixer may generate the transmit signal based on the sum of the first centered signal and the second centered signal including the amplified amplitudes.

In some aspects, the channel element may wirelessly transmit the transmit signal. In some aspects, the channel element may include at least one of a wide band stripline, an antenna element, and a waveguide.

The receiver may include a rx frequency converter, a demodulator, a rx amplifier, a sample and hold filter, and a channel element. The channel element of the receiver may include at least one of an antenna element, a stripline, and a waveguide. The channel element of the receiver may wirelessly receive a receive signal. In some aspects, the receive signal may include a first portion and a second portion that both include data. The first portion may be modulated according to the first modulation scheme. The second portion may be modulated according to the second modulation scheme.

The rx amplifier may receive the receive signal. The rx amplifier may generate a first received signal at a first frequency based on the first portion. The first received signal may be representative of the first portion. The rx amplifier may generate a second received signal at a second frequency based on the second portion. The second received signal may be representative of the second portion.

In some aspects, the rx amplifier may compensate for non-linearities in the transmitter, the receiver, or some combination thereof. In these and other aspects, the rx amplifier may include one or more low noise amplifiers (LNAs) or mixed filters to select the frequency bands for detection. Each of the LNAs may be locked to an intended frequency band.

The rx frequency converter may convert the first received signal at the first frequency to a third frequency within the frequency band. The third frequency may be different than the first frequency. The rx frequency converter may convert the second received signal to a fourth frequency within the frequency band. The fourth frequency may be different than the second frequency. The second received signal may be orthogonal to the first received signal. Further, a frequency gap may be positioned between the first received signal and the second received signal within the frequency band.

The first received signal may include a first bandwidth and the second received signal may include a second bandwidth. In some aspects, the frequency gap between the first bandwidth and the second bandwidth may be sized based on the first bandwidth, the second bandwidth, and the frequency band. In these and other aspects, the first frequency may be substantially equal to zero GHz.

The first frequency may include a first frequency band and the second frequency may include a second frequency band. The first received signal may include a first symbol rate that is equal to a Nyquist bandwidth of the first frequency band. The second received signal may include a symbol rate that is equal to the Nyquist bandwidth of the second frequency band.

The first bandwidth and the second bandwidth may be determined according to:

$$\frac{BW}{x-1}$$

in which x is equal to a number of carriers within the frequency band and BW is equal to a bandwidth of the frequency band.

The demodulator may demodulate the first received signal according to the first modulation scheme. The demodulator may demodulate the first received signal to recover the data within the first received signal. The demodulator may demodulate the second received signal according to the second modulation scheme. The demodulator may demodulate the second received signal to recover the data within the second received signal.

In some aspects, the first modulation scheme may include a four PAM scheme. In these and other aspects, the second modulation scheme may include at least one of a QPSK modulation scheme, a BPSK modulation scheme, and a QAM scheme. Further, the second modulation scheme may include a higher bit resolution than the first modulation scheme.

The sample and hold filter may receive the first received signal at the third frequency. The sample and hold filter may also receive the second received signal at the fourth frequency. Further, the sample and hold filter may filter the first received signal at the third frequency and the second received signal at the fourth frequency.

In some aspects, the sample and hold filter may be omitted. For example if the first received signal and the second received signal do not overlap, the sample and hold filter may be omitted.

A transceiver for chip to chip communication may include a transmitter, a receiver, or some combination thereof. The transmitter may include a modulator, a transmit frequency converter, a mixer, a tx amplifier, and a channel element. The receiver may include a receive frequency converter, a demodulator, a rx amplifier, a sample and hold filter, and a channel element.

The modulator may modulate a first tx signal according to a first modulation scheme. The modulator may also modulate a second tx signal according to a second modulation scheme. In some aspects, the first modulation scheme may include a four PAM scheme. In these and other aspects, the second modulation scheme may include at least one of a QPSK modulation scheme, a BPSK modulation scheme, and a QAM scheme. In addition, the second modulation scheme may include a higher bit resolution than the first modulation scheme.

The transceiver (e.g., the transmit frequency converter) may determine a number of signals to be transmitted by the transmitter. The transceiver may divide the frequency band by the number of signals to be transmitted by the transmitter. The transmit frequency converter may center the first tx signal on a first frequency within the frequency band to generate a first centered signal. In some aspects, the first frequency may not include a phase. The transmit frequency converter may center the second signal on a second frequency within the frequency band to generate a second centered signal. In some aspects, the second signal may include a phase. The second centered signal may be orthogonal to the first centered signal. In addition, a frequency gap may be positioned between the first centered signal and the second centered signal.

In some aspects, the first frequency and the second frequency may be positioned at frequencies that are equal to different integer multiples of a quotient of the frequency band divided by the number of signals to be transmitted by the transmitter. In these and other aspects, the first frequency may be substantially equal to zero GHZ.

The first tx signal may include a first bandwidth and the second tx signal may include a second bandwidth. The transmit frequency converter may center the first tx signal on the first frequency and the second tx signal on the second frequency such that the frequency gap is sized based on the first bandwidth, the second bandwidth, and the frequency band.

In some aspects, the first bandwidth and the second bandwidth may be equal to each other.

The transmit frequency converter may center the first tx signal on the first frequency and the second tx signal on the second frequency such that the frequency gap includes a bandwidth equal to a bandwidth of the frequency band minus a bandwidth of the first signal and minus a bandwidth of the second signal.

In some aspects, the first bandwidth and the second bandwidth may be determined according to:

$$\frac{BW}{x-1}$$

in which x is equal to a number of carriers within the frequency band and BW is equal to a bandwidth of the frequency band.

The first frequency may include a first frequency band and the second frequency may include a second frequency band. The first tx signal may include a first symbol rate that is equal to a Nyquist bandwidth of the first frequency band. In addition, the second tx signal may include a symbol rate that is equal to the Nyquist bandwidth of the second frequency band.

In some aspects, the first centered signal and the second centered signal may both include amplitudes. The tx amplifier may receive the first centered signal and the second centered signal. The tx amplifier may also amplify the amplitudes of the first centered signal and the second centered signal.

The mixer may generate a tx signal based on a sum of the first centered signal and the second centered signal. The mixer is configured to generate the tx signal based on the sum of the first centered signal and the second centered signal including the amplified amplitudes.

The channel element of the transmitter may transmit the tx signal. The channel element of the transmitter may include at least one of an antenna element, a stripline, and a waveguide. The channel element of the receiver may wirelessly receive a transmit signal as a rx signal. The channel element of the receiver may include at least one of an antenna element, a stripline, and a waveguide.

The rx amplifier may receive the rx signal including a first portion and a second portion. The receive signal may include a first portion at the first frequency and a second portion at the second frequency. The first portion may be modulated according to the first modulation scheme and may include data. The second portion may be modulated according to the second modulation scheme and may include data. The rx amplifier may generate a first rx signal at the first frequency based on the first portion. The rx amplifier may also generate a second rx signal at the second frequency based on the second portion.

The receive frequency converter may convert the first rx signal to a third frequency within the frequency band. The third frequency may be different than the first frequency. The receive frequency converter may convert the second rx signal to a fourth frequency within the frequency band. The fourth frequency may be different than the second frequency. The second rx signal may be orthogonal to the first rx signal. In addition, a frequency gap may be positioned between the first rx signal and the second rx signal.

The demodulator may demodulate the first rx signal according to the first modulation scheme. The demodulator may demodulate the first rx signal to recover the data within the first rx signal. The demodulator may demodulate the second rx signal according to the second modulation scheme. The demodulator may demodulate the second rx signal to recover the data within the second rx signal.

The sample and hold filter may receive the first rx signal at the third frequency and the second rx signal at the fourth frequency. The sample and hold filter may also filter the first rx signal the third frequency and the second rx signal at the fourth frequency.

Example 1 may include a transmitter for chip to chip communication, the transmitter includes: a modulator configured to: modulate a first received signal according to a first modulation scheme; and modulate a second received signal according to a second modulation scheme; a transmit frequency converter configured to: center the first received signal on a first frequency that does not include a phase within a frequency band to generate a first centered signal; and center the second received signal on a second frequency that includes a phase within the frequency band to generate a second centered signal, the second centered signal being orthogonal to the first centered signal and a frequency gap being positioned between the first centered signal and the second centered signal within the frequency band.

Example 2 may include the transmitter of example 1 further including: a mixer configured to generate a transmit signal based on a sum of the first centered signal and the second centered signal; and a channel element configured to wirelessly transmit the transmit signal.

Example 3 may include the transmitter of example 2, wherein the first centered signal and the second centered signal both include amplitudes, the transmitter further including an amplifier configured to: receive the first centered signal and the second centered signal; and amplify the amplitudes of the first centered signal and the second centered signal, wherein the mixer is configured to generate the transmit signal based on the sum of the first centered signal and the second centered signal including the amplified amplitudes.

Example 4 may include the transmitter of any of examples 1-3, wherein the transmit frequency converter is further configured to: determine a number of signals to be transmitted by the transmitter; and divide the frequency band by the number of signals to be transmitted by the transmitter, wherein the first frequency and the second frequency are positioned at frequencies that are equal to different integer multiples of a quotient of the frequency band divided by the number of signals to be transmitted by the transmitter.

Example 5 may include the transmitter of any of examples 1-4, wherein the first received signal includes a first bandwidth and the second received signal includes a second bandwidth, wherein the transmit frequency converter centers the first received signal on the first frequency and the second received signal on the second frequency such that the frequency gap is sized based on the first bandwidth, the second bandwidth, and the frequency band.

Example 6 may include the transmitter of example 5, wherein the first bandwidth and the second bandwidth are equal to each other.

Example 7 may include the transmitter of any of examples 1-4, wherein the transmit frequency converter centers the first received signal on the first frequency and the second received signal on the second frequency such that the frequency gap includes a bandwidth equal to a bandwidth of the frequency band minus a bandwidth of the first signal and minus a bandwidth of the second signal.

Example 8 may include the transmitter of any of examples 5-7, wherein the first bandwidth and the second bandwidth are determined according to:

$$\frac{BW}{x-1}$$

in which x is equal to a number of carriers within the frequency band and BW is equal to a bandwidth of the frequency band.

Example 9 may include the transmitter of any of examples 1-8, wherein the first frequency is zero gigahertz.

Example 10 may include the transmitter of any of examples 1-9, wherein the first frequency includes a first frequency band and the second frequency includes a second frequency band, and wherein the first received signal include a first symbol rate that is equal to a Nyquist bandwidth of the first frequency band and the second received signal include a symbol rate that is equal to the Nyquist bandwidth of the second frequency band.

Example 11 may include the transmitter of examples 2, wherein the channel element includes at least one of an antenna element, a stripline, and a waveguide.

Example 12 may include the transmitter of any of examples 1-11, wherein the first modulation scheme includes a four pulse amplitude modulation scheme and the second modulation scheme includes at least one of a QPSK modulation scheme, a BPSK modulation scheme, and a QAM scheme.

Example 13 may include the transmitter of any of examples 1-12, wherein the second modulation scheme includes a higher bit resolution than the first modulation scheme.

Example 14 may include a receiver for chip to chip communication, the receiver including: a receive frequency converter configured to: convert a first received signal at a first frequency within a frequency band to a third frequency within the frequency band that is different than the first frequency, the first received signal modulated according to a first modulation scheme and including data; and convert a second received signal at a second frequency within the frequency band to a fourth frequency within the frequency band that is different than the second frequency, the second received signal modulated according to a second modulation scheme and including data, the second received signal being orthogonal to the first received signal, and a frequency gap being positioned between the first received signal and the second received signal within the frequency band; and a demodulator configured to: demodulate the first received signal at the third frequency according to the first modulation scheme to recover the data within the first received signal; and demodulate the second received signal at the fourth frequency according to the second modulation scheme to recover the data within the second received signal.

Example 15 may include the receiver of example 14 further including an amplifier configured to: receive a receive signal including a first portion and a second portion, the first portion modulated according to the first modulation scheme and the second portion modulated according to the second modulation scheme; generate the first received signal at the first frequency based on the first portion; and generate the second received signal at the second frequency based on the second portion.

Example 16 may include the receiver of any of examples 14 and 15 further including a sample and hold filter configured to: receive the first received signal at the third frequency and the second received signal at the fourth frequency; and filter the first received signal the third frequency and the second received signal at the fourth frequency.

Example 17 may include the receiver of any of examples 14-16, wherein the first received signal includes a first bandwidth and the second received signal includes a second bandwidth, wherein the frequency gap between the first bandwidth and the second bandwidth is sized based on the first bandwidth, the second bandwidth, and the frequency band.

Example 18 may include the receiver of any of examples 14-17, wherein the first frequency includes a first frequency band and the second frequency includes a second frequency band, and wherein the first received signal include a first symbol rate that is equal to a Nyquist bandwidth of the first frequency band and the second received signal include a symbol rate that is equal to the Nyquist bandwidth of the second frequency band.

Example 19 may include the receiver of any of examples 17 and 18, wherein the first bandwidth and the second bandwidth are determined according to:

$$\frac{BW}{x-1}$$

in which x is equal to a number of carriers within the frequency band and BW is equal to a bandwidth of the frequency band.

Example 20 may include the receiver of any of examples 14-19, wherein the first frequency is zero gigahertz.

Example 21 may include the receiver of example 15 further including a channel element configured to wirelessly receive the receive signal.

Example 22 may include the receiver of example 21, wherein the receiver element includes at least one of an antenna element, a stripline, and a waveguide.

Example 23 may include the receiver of any of examples 14-22, wherein the first modulation scheme includes a four pulse amplitude modulation scheme and the second modulation scheme includes at least one of a QPSK modulation scheme, a BPSK scheme, and a QAM scheme.

Example 24 may include the receiver of any of examples 14-23, wherein the second modulation scheme includes a higher bit resolution than the first modulation scheme.

Example 25 may include a transceiver for chip to chip communication, the transceiver including: a transmitter including: a modulator configured to: modulate a first tx signal according to a first modulation scheme; and modulate a second tx signal according to a second modulation scheme; a transmit frequency converter configured to: center the first tx signal on a first frequency that does not include a phase within a frequency band to generate a first centered signal; and center the second signal on a second frequency that includes a phase within the frequency band to generate a second centered signal, the second centered signal being orthogonal to the first centered signal and a frequency gap being positioned between the first centered signal and the second centered signal within the frequency band; and a receiver including: a receive frequency converter configured to: convert a first rx signal at the first frequency within the frequency band to a third frequency within the frequency band that is different than the first frequency, the first rx signal modulated according to the first modulation scheme and including data; and convert a second rx signal at the second frequency within the frequency band to a fourth frequency within the frequency band that is different than the second frequency, the second rx signal modulated according to the second modulation scheme and including data, the second rx signal being orthogonal to the first rx signal, and a frequency gap being positioned between the first rx signal and the second rx signal within the frequency band; and a demodulator configured to: demodulate the first rx signal at the third frequency according to the first modulation scheme to recover the data within the first rx signal; and demodulate the second rx signal at the fourth frequency according to the second modulation scheme to recover the data within the second rx signal.

Example 26 may include the transceiver of example 25 further including: a mixer configured to generate a tx signal based on a sum of the first centered signal and the second centered signal; and a channel element configured to wirelessly transmit the tx signal.

Example 27 may include the transceiver of example 26, wherein the first centered signal and the second centered signal both include amplitudes, the transmitter further including a tx amplifier configured to: receive the first centered signal and the second centered signal; and amplify the amplitudes of the first centered signal and the second centered signal, wherein the mixer is configured to generate the tx signal based on the sum of the first centered signal and the second centered signal including the amplified amplitudes.

Example 28 may include the transceiver of any of examples 25-27, wherein the transmit frequency converter is further configured to: determine a number of signals to be transmitted by the transmitter; and divide the frequency band by the number of signals to be transmitted by the transmitter, wherein the first frequency and the second frequency are positioned at frequencies that are equal to different integer multiples of a quotient of the frequency band divided by the number of signals to be transmitted by the transmitter.

Example 29 may include the transceiver of any of examples 25-28, wherein the first tx signal includes a first bandwidth and the second tx signal includes a second bandwidth, wherein the transmit frequency converter centers the first tx signal on the first frequency and the second tx signal on the second frequency such that the frequency gap is sized based on the first bandwidth, the second bandwidth, and the frequency band.

Example 30 may include the transceiver of example 29, wherein the first bandwidth and the second bandwidth are equal to each other.

Example 31 may include the transceiver of any of examples 25-28, wherein the transmit frequency converter centers the first tx signal on the first frequency and the second tx signal on the second frequency such that the frequency gap includes a bandwidth equal to a bandwidth of the frequency band minus a bandwidth of the first signal and minus a bandwidth of the second signal.

Example 32 may include the transceiver of any of examples 29-31, wherein the first bandwidth and the second bandwidth are determined according to:

$$\frac{BW}{x-1}$$

in which x is equal to a number of carriers within the frequency band and BW is equal to a bandwidth of the frequency band.

Example 33 may include the transceiver of any of example 25-32, wherein the first frequency is zero gigahertz.

Example 34 may include the transceiver of any of examples 25-33, wherein the first frequency includes a first frequency band and the second frequency includes a second frequency band, and wherein the first tx signal include a first symbol rate that is equal to a Nyquist bandwidth of the first frequency band and the second tx signal include a symbol rate that is equal to the Nyquist bandwidth of the second frequency band.

Example 35 may include the transceiver of example 26, wherein the channel element includes at least one of an antenna element, a stripline, and a waveguide.

Example 36 may include the transceiver of any of examples 25-35, wherein the first modulation scheme includes a four pulse amplitude modulation scheme and the second modulation scheme includes at least one of a QPSK modulation scheme, a BPSK modulation scheme, and a QAM scheme.

Example 37 may include the transceiver of any of examples 25-36, wherein the second modulation scheme includes a higher bit resolution than the first modulation scheme.

Example 38 may include the transceiver of any of examples 25-37, wherein the receiver further includes a rx amplifier configured to: receive a rx signal including a first portion and a second portion, the first portion modulated according to the first modulation scheme and the second portion modulated according to the second modulation scheme; generate the first rx signal at the first frequency based on the first portion; and generate the second rx signal at the second frequency based on the second portion.

Example 39 may include the transceiver of any of examples 25-38, wherein the receiver further includes a sample and hold filter configured to: receive the first rx signal at the third frequency and the second rx signal at the fourth frequency; and filter the first rx signal the third frequency and the second rx signal at the fourth frequency.

Example 40 may include the transceiver of example 38, wherein the receiver further includes a channel element configured to wirelessly receive the receive signal.

Example 41 may include the transceiver of example 40, wherein the channel element includes at least one of an antenna element, a stripline, and a waveguide.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:
1. A transmitter for chip to chip communication, the transmitter comprising:
    a modulator configured to:
        modulate a first received signal according to a first modulation scheme; and
        modulate a second received signal according to a second modulation scheme;

a transmit frequency converter configured to:
  center the first received signal on a first frequency that does not comprise a phase within a frequency band to generate a first centered signal; and
  center the second received signal on a second frequency that comprises a phase within the frequency band to generate a second centered signal, the second centered signal being orthogonal to the first centered signal and a frequency gap being positioned between the first centered signal and the second centered signal within the frequency band.

2. The transmitter of claim 1 further comprising:
a mixer configured to generate a transmit signal based on a sum of the first centered signal and the second centered signal; and
a channel element configured to wirelessly transmit the transmit signal.

3. The transmitter of claim 1, wherein the transmit frequency converter is further configured to:
  determine a number of signals to be transmitted by the transmitter; and
  divide the frequency band by the number of signals to be transmitted by the transmitter, wherein the first frequency and the second frequency are positioned at frequencies that are equal to different integer multiples of a quotient of the frequency band divided by the number of signals to be transmitted by the transmitter.

4. The transmitter of claim 1, wherein the first frequency is zero gigahertz.

5. The transmitter of claim 1, wherein the second modulation scheme comprises a higher bit resolution than the first modulation scheme.

6. A receiver for chip to chip communication, the receiver comprising:
a receive frequency converter configured to:
  convert a first received signal at a first frequency within a frequency band to a third frequency within the frequency band that is different than the first frequency, the first received signal modulated according to a first modulation scheme and comprising data; and
  convert a second received signal at a second frequency within the frequency band to a fourth frequency within the frequency band that is different than the second frequency, the second received signal modulated according to a second modulation scheme and comprising data, the second received signal being orthogonal to the first received signal, and a frequency gap being positioned between the first received signal and the second received signal within the frequency band; and
a demodulator configured to:
  demodulate the first received signal at the third frequency according to the first modulation scheme to recover the data within the first received signal; and
  demodulate the second received signal at the fourth frequency according to the second modulation scheme to recover the data within the second received signal.

7. The receiver of claim 6 further comprising an amplifier configured to:
receive a receive signal comprising a first portion and a second portion, the first portion modulated according to the first modulation scheme and the second portion modulated according to the second modulation scheme;
generate the first received signal at the first frequency based on the first portion; and
generate the second received signal at the second frequency based on the second portion.

8. The receiver of claim 6 further comprising a sample and hold filter configured to:
receive the first received signal at the third frequency and the second received signal at the fourth frequency; and
filter the first received signal the third frequency and the second received signal at the fourth frequency.

9. The receiver of claim 6, wherein the first received signal comprises a first bandwidth and the second received signal comprises a second bandwidth, wherein the frequency gap between the first bandwidth and the second bandwidth is sized based on the first bandwidth, the second bandwidth, and the frequency band.

10. The receiver of claim 9, wherein the first bandwidth and the second bandwidth are determined according to:

$$\frac{BW}{x-1}$$

in which x is equal to a number of carriers within the frequency band and BW is equal to a bandwidth of the frequency band.

11. The receiver of claim 6, wherein the first frequency is zero gigahertz.

12. The transceiver of claim 6, wherein the second modulation scheme comprises a higher bit resolution than the first modulation scheme.

13. A transceiver for chip to chip communication, the transceiver comprising:
a transmitter comprising:
  a modulator configured to:
    modulate a first transmit (tx) signal according to a first modulation scheme; and
    modulate a second tx signal according to a second modulation scheme;
  a transmit frequency converter configured to:
    center the first tx signal on a first frequency that does not comprise a phase within a frequency band to generate a first centered signal; and
    center the second signal on a second frequency that comprises a phase within the frequency band to generate a second centered signal, the second centered signal being orthogonal to the first centered signal and a frequency gap being positioned between the first centered signal and the second centered signal within the frequency band; and
a receiver comprising:
  a receive frequency converter configured to:
    convert a first receive (rx) signal at the first frequency within the frequency band to a third frequency within the frequency band that is different than the first frequency, the first rx signal modulated according to the first modulation scheme and comprising data; and
    convert a second rx signal at the second frequency within the frequency band to a fourth frequency within the frequency band that is different than the second frequency, the second rx signal modulated according to the second modulation scheme and comprising data, the second rx signal being orthogonal to the first rx signal, and a frequency gap being positioned between the first rx signal and the second rx signal within the frequency band; and a demodulator configured to:
  demodulate the first rx signal at the third frequency according to the first modulation scheme to recover the data within the first rx signal; and
  demodulate the second rx signal at the fourth frequency according to the second modulation scheme to recover the data within the second rx signal.

14. The transceiver of claim 13 further comprising:
a mixer configured to generate a tx signal based on a sum of the first centered signal and the second centered signal; and
a channel element configured to wirelessly transmit the tx signal.

15. The receiver of claim 14 further comprising a channel element configured to wirelessly receive the receive signal.

16. The transceiver of claim 13, wherein the transmit frequency converter is further configured to:
  determine a number of signals to be transmitted by the transmitter; and
  divide the frequency band by the number of signals to be transmitted by the transmitter, wherein the first frequency and the second frequency are positioned at frequencies that are equal to different integer multiples of a quotient of the frequency band divided by the number of signals to be transmitted by the transmitter.

17. The transceiver of claim 13, wherein the first tx signal comprises a first bandwidth and the second tx signal comprises a second bandwidth, wherein the transmit frequency converter centers the first tx signal on the first frequency and the second tx signal on the second frequency such that the frequency gap is sized based on the first bandwidth, the second bandwidth, and the frequency band.

18. The transceiver of claim 17, wherein the first bandwidth and the second bandwidth are equal to each other.

19. The transceiver of claim 13, wherein the second modulation scheme comprises a higher bit resolution than the first modulation scheme.

20. The transceiver of claim 13, wherein the receiver further comprises a sample and hold filter configured to:
  receive the first rx signal at the third frequency and the second rx signal at the fourth frequency; and
  filter the first rx signal the third frequency and the second rx signal at the fourth frequency.

* * * * *